J. D. Mets. Sheet 1. 2 Sheets.

Photographic Album.

No. 1,581. Reissued Dec. 1, 1863.

Witnesses.

Inventor
John D. Mets
by his atty's
Mason, Fenwick & Lawrence

J. D. Mets. Sheet 2. 2 Sheets.

Photographic Album.

No. 1,581. Reissued Dec. 1, 1863.

Witnesses.
R. T. Campbell
James N. Campbell

Inventor
John D. Mets
by his atty's
Mason, Fenwick & Lawrence

UNITED STATES PATENT OFFICE.

ALTEMUS & COMPANY, OF PHILADELPHIA, PENNSYLVANIA, ASSIGNEES OF JOHN D. METS.

IMPROVEMENT IN PHOTOGRAPHIC ALBUMS.

Specification forming part of Letters Patent No. 39,300, dated July 21, 1863; Reissue No. 1,581, dated December 1, 1863.

*To all whom it may concern:*

Be it known that we, SAMUEL T. ALTEMUS and HENRY ALTEMUS, both of the city of Philadelphia, and State of Pennsylvania, and trading under the name of ALTEMUS & Co., have become the owners of certain Letters Patent for Improvements in Photograph-Albums and other Books, granted to JOHN D. METS on the 21st day of July, 1863, which Letters Patent we deem inoperative and invalid by reason of a defective and insufficient specification; and we do hereby declare the following to be a full, clear, and exact description of the said invention, reference being had to the accompanying drawings, and and to the letters of reference marked thereon.

The invention of the said JOHN D. METS relates to the binding of photograph-albums and other books having thick and stiff leaves; and our invention consists of a succession of leaves hinged together substantially in the manner described hereinafter, so as to insure that security which is not attained by the usual manner of binding books of this class.

In order to enable others skilled in the art to carry out the said invention, we will now proceed to describe the manner of constructing the same.

Figure 1:
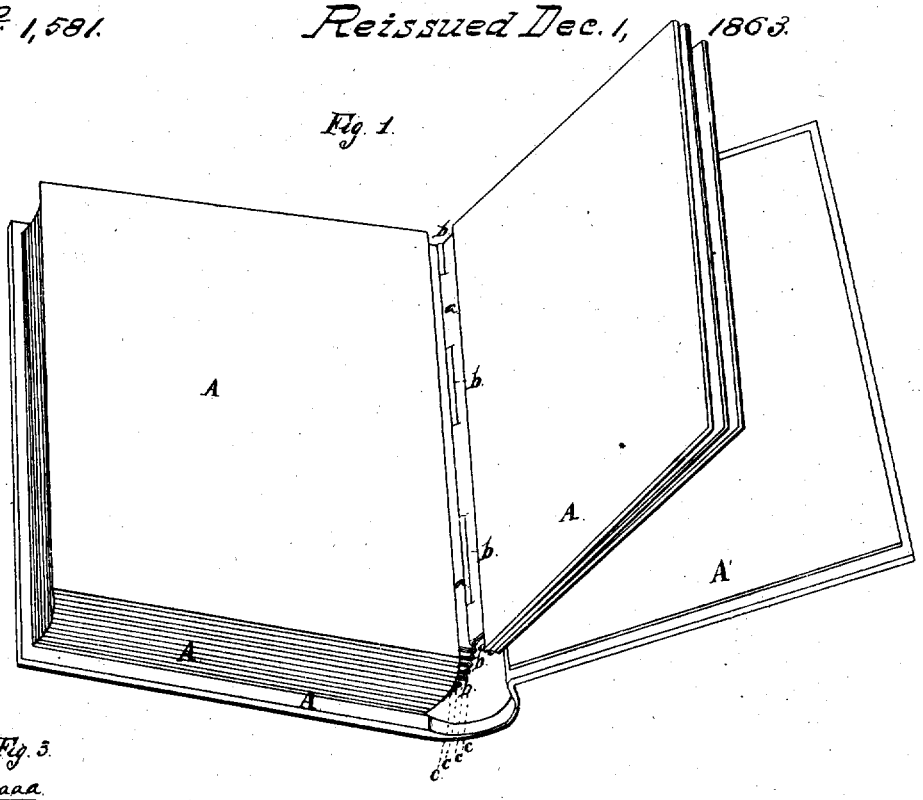
Figure 2:
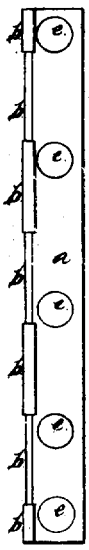
Figure 3:
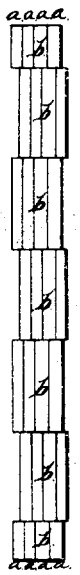
Figure 4:
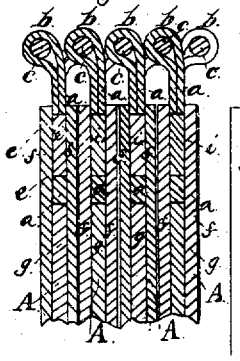
Figure 5:
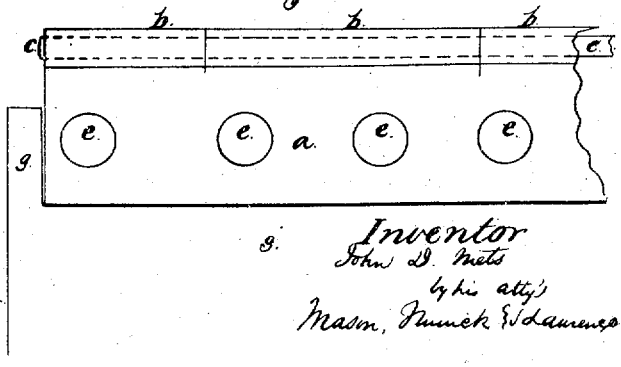
Figure 7:
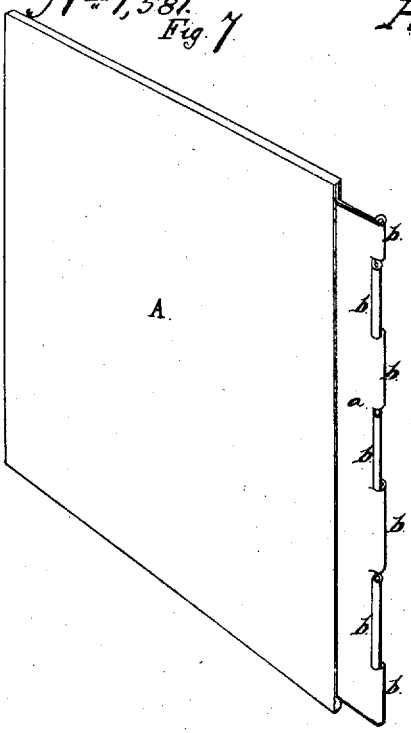
Figure 6:
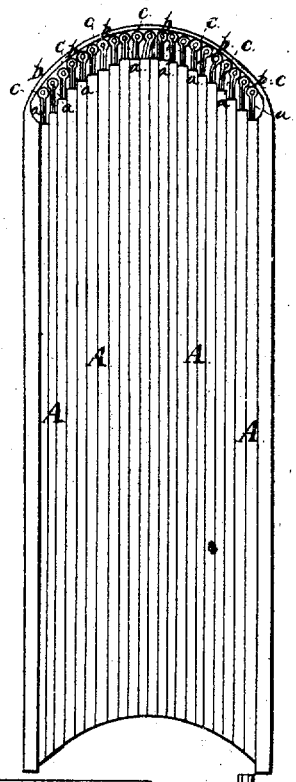
Figure 8:
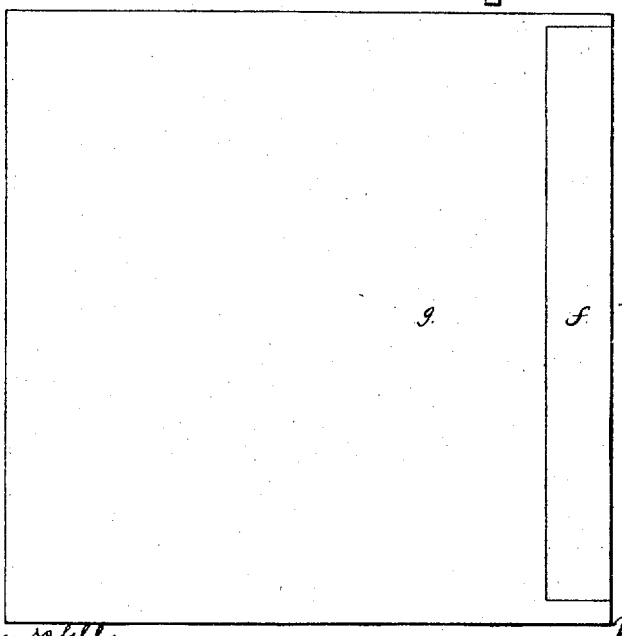
Figure 9:
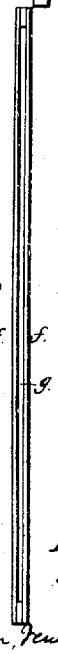

On reference to the accompanying drawings which forms a part of this specification, Figure 1 is a perspective view of a book with the improved hinge-binding; Fig. 2, a side view of one of the strips or plates which forms a part of one of the hinges; Fig. 3, a rear view of the leaves, showing the manner of hinging the same together; Fig. 4, an enlarged sectional view illustrating the manner of securing the leaves of the book to the hinges; Fig. 5, a side view of a portion of one of the hinged strips; Fig. 6, an end view of the book with the hinged leaves; Fig. 7, a perspective view of one of the leaves of the book with hinged strip or plate. Figs. 8 and 9 illustrate a manner of constructing the leaves to receive the hinged strips.

Similar letters refer to similar parts throughout the several views.

The thick and stiff leaves which are required in photograph-albums and other books cannot be bound together by stitching in the manner employed in binding ordinary books. Several modes, none of them of a very durable character, have consequently been resorted to in securing the leaves of this class of books.

One of the modes of carrying out the invention may be described as follows: In Fig. 1 is represented an album or other book, in which the leaves are all secured together at their backs by means of hinged joints, which in the present instance consist of thin strips or plates *a*, of metal or other suitable material, on the edge of which are the tubular projections *b b*. (Shown clearly in Figs. 2, 3, 4, 5, and 7.) These hinged strips or plates may be formed as follows: A strip of metal or other suitable material of the desired width and length is folded over a rod in the direction of its length, and a tubular projection is thus formed on the edge of the folded plate, which, being cut at suitable points, the projections *b b* are bent alternately, one projection on one side, and the adjacent projection on the other side, thus forming a hinge strip or plate, to which a plate corresponding in size, but differing in respect to the position of its tubular projections *b*, may be hinged by means of a pin, *c*, which should be as long as the hinge-plates and of such a size as will fit snugly into the eyes of the projections. Thus the spaces between the projections of one plate will receive and be filled up by the projections *b* of the opposite plate, and in this manner any number of these plates may be hinged together.

The thickness of the leaves to be used in the book must determine the diameter of the tubular projections *b b*, for the spaces between the plates or strips must be made in accordance, or nearly so, with the thickness of the leaves, and the widths of these spaces are determined by the diameter of the projections.

When the plates *a* have been formed with their right and left projections *b*, holes *e e* are punched in the plates, as seen in Figs. 2, 4, and 5, these holes being intended to receive pieces of paper or other suitable material, which unite the two outside sheets, *f f*, of the leaves A to the plates *a*, as will be hereinafter described.

The leaves A consist of two outside sheets, *f f*, and an inside sheet, *g*, shown in Figs. 4, 8, and 9, the inner sheet being cut out, as shown in Fig. 8, to receive the plates *a*, the length of which is not equal to that of the leaves. The inside portion, *g*, is therefore cut so that the ends of the plates will be covered and the spaces between the portions *f f* filled up at these points. The manner of uniting these hinge-plates to the leaves is as follows: Three sheets of paper, *f f* and *g*, being used for each leaf, the inside piece, *g*, is cut as above described and pasted on one of the outside pieces, *f*. The hinge-plate is now adjusted within the space left by the portion which is cut out of the sheet *g*, and pieces of paper *i*, of the size and shape of the holes *e e*, are now pasted on both sides and inserted within these holes. The other outside sheet, *f*, is now pasted over the whole, and the leaf thus formed with its hinge-plate (shown in Fig. 7) is permitted to dry.

The small pieces of paper *i*, which are introduced into the holes of the plate *a*, should not be thicker than this plate, as they furnish surfaces to which the outside sheets, *f f*, can be pasted, so that when the whole is dry the hinge-plate will be securely confined to the leaf. The holes *e* may be made either round or square, oblong, or of any other form, and filled up with corresponding-shaped pieces of paper, pasteboard, or other suitable material.

The leaves, with their hinge plate or strips, are put together by passing small wire rods or pins *e* through the tubular projections *b*, every wire connecting two leaves together in consequence of its passing through the bent projections *b* of each hinge-plate. When a suitable number of leaves to make a book are thus connected together, they are put into a press, and their edges plowed or trimmed.

The covers may be made and finished in the usual manner of making covers for books which are not stitched, and the two outside leaves are pasted down on the inside faces of the covers and then dried under pressure.

A particular form of hinge has been described as applicable to the improved method of binding albums and other books; but it will be seen that a hinge might be constructed out of a single plate, which is not doubled, the tubular projections in this case being made by bending over the metal after it has been cut, and, if required, soldering down the edges; or the tubular projections may be made of the same material as, and form a part of, the leaves; or the hinged strips may be made of leather, cloth, canvas, gutta-percha, and other materials, which may be simply pasted to the leaves without making use of holes *e e* and paper fitted into the said holes, the latter being employed only when metal plates have to be secured to the leaves.

Although special allusion has been made to the binding of photograph-albums, it will be evident that the invention is applicable to the binding of tablets and all books having thick and strong leaves which it is advisable to bind together securely and permanently—such, for instance, as the sample-books used by drapers and others, and books used by botanists for containing dried samples of plants.

We claim as the invention of the said J. D. METS and desire to secure by Letters Patent—

1. A photograph-album or other book consisting of a succession of leaves hinged together substantially as described.

2. The use of the perforated plates *a*, secured to the leaves and hinged together substantially as set forth.

In testimony whereof we have signed our names to this specification before two subscribing witnesses.

SAMUEL T. ALTEMUS.
HENRY ALTEMUS.

Witnesses:
JOHN WHITE,
HENRY HERDLER.